United States Patent
Park et al.

(10) Patent No.: US 10,697,364 B2
(45) Date of Patent: Jun. 30, 2020

(54) ENGINE SYSTEM AND METHOD FOR CONTROLLING THE SAME

(71) Applicants: Hyundai Motor Company, Seoul (KR); Kia Motors Corporation, Seoul (KR)

(72) Inventors: Suk Il Park, Hwaseong-si (KR); Jeong Hyun Na, Hwaseong-si (KR); Young Kyung Choi, Busan (KR); Young Hwan Kim, Namyangju-si (KR); Seung Il Moon, Seoul (KR); Jong Gyun Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 21 days.

(21) Appl. No.: 16/123,762

(22) Filed: Sep. 6, 2018

(65) Prior Publication Data
US 2019/0178154 A1 Jun. 13, 2019

(30) Foreign Application Priority Data
Dec. 11, 2017 (KR) .................. 10-2017-0169441

(51) Int. Cl.
*F02B 47/02* (2006.01)
*F02M 25/022* (2006.01)
(Continued)

(52) U.S. Cl.
CPC .......... *F02B 47/02* (2013.01); *F02D 41/0007* (2013.01); *F02D 41/0025* (2013.01);
(Continued)

(58) Field of Classification Search
CPC ........... F02M 25/0221; F02M 25/0222; F02M 25/0224; F02M 25/0225; F02M 25/0227; F02M 25/025; F02M 25/028; F02M 25/0228; F02M 25/03; F02M 37/24; F02D 41/0025; F02D 19/12; F02D 41/20; F02D 2041/2027; F02B 47/02; Y02T 10/121
(Continued)

(56) References Cited

U.S. PATENT DOCUMENTS 4,351,289 A * 9/1982 Renda .................. F02D 19/12
123/25 A
6,145,294 A * 11/2000 Traver .................. F23K 5/18
60/39.094
(Continued)

*Primary Examiner* — Jacob M Amick
*Assistant Examiner* — Michael A Kessler
(74) *Attorney, Agent, or Firm* — Morgan, Lewis & Bockius LLP

(57) ABSTRACT

A method for controlling an engine system, may include a water injection operation of injecting water into an intake system of an engine through a water injector of a water injection system in a first operating condition of the engine in which water injection is required, a compressed air injection operation of injecting compressed air into the intake system through a purge circuit of the water injection system in a second operating condition of the engine in which compressed air injection is required, and a water injection stop operation of stopping the water injection of the water injection system in a third operating condition of the engine in which water injection stop is required.

15 Claims, 14 Drawing Sheets

(51) Int. Cl.

| | |
|---|---|
| *F02M 25/028* | (2006.01) |
| *F02D 19/12* | (2006.01) |
| *F02D 41/00* | (2006.01) |
| *F02D 41/20* | (2006.01) |
| *F02M 25/025* | (2006.01) |

(52) U.S. Cl.
CPC ........... *F02D 41/20* (2013.01); *F02M 25/025* (2013.01); *F02M 25/028* (2013.01); *F02M 25/0221* (2013.01); *F02M 25/0227* (2013.01); *F02D 19/12* (2013.01); *F02D 2041/2027* (2013.01); *F02M 25/0228* (2013.01)

(58) Field of Classification Search
USPC ..................................... 123/25 A, 25 C, 25 J
See application file for complete search history.

(56) References Cited

U.S. PATENT DOCUMENTS

| | | | |
|---|---|---|---|
| 6,267,086 B1 * | 7/2001 | Dingle | .................. F02M 43/00 |
| | | | 123/25 C |
| 2018/0038319 A1 * | 2/2018 | Hakeem | .............. F02D 41/0025 |
| 2018/0274488 A1 * | 9/2018 | Martin | ................ F02M 25/0222 |
| 2019/0120176 A1 * | 4/2019 | Park | .................. F02M 25/0222 |

* cited by examiner

ENGINE SYSTEM AND METHOD FOR CONTROLLING THE SAME

CROSS-REFERENCE TO RELATED APPLICATION

The present application claims priority to Korean Patent Application No. 10-2017-0169441, filed on Dec. 11, 2017, in the Korean Intellectual Property Office, the entire contents of which is incorporated herein for all purposes by this reference.

BACKGROUND OF THE INVENTION

Field of the Invention

The present invention relates to an engine system and a method for controlling the same and, more particularly, to an engine system and a method for controlling the same, configured for individually performing a water injection operation, a compressed air injection operation, and a water injection stop operation according to the operating conditions of an engine to thereby achieve the optimal performance of the engine system in all operating conditions of the engine.

Description of Related art

A variety of techniques have been researched and developed for reducing combustion heat during combustion in an internal combustion engine of a vehicle to reduce emissions of nitrogen oxides ($NO_x$), hydrocarbons, and the like, and reducing a mixture ratio of air and fuel to improve fuel efficiency.

As a representative technique for reducing combustion heat and $NO_x$ emissions and improving fuel efficiency, an exhaust gas recirculation (EGR) system, a water injection system, or the like has been researched and developed.

The EGR system may be configured to recirculate exhaust gases from an exhaust system to an intake system. The EGR system may control the EGR to reduce $NO_x$ through heat absorption and a reduction in the concentration of oxygen in a combustion chamber.

The water injection system may be configured to spray water into the incoming air or fuel-air mixture, or directly into an intake port of an engine. Water injection may lower the temperature of the combustion chamber, increase air intake efficiency, reduce emissions, and reduce the mixture ratio of air and fuel to thereby increase the output and a torque of the engine. When the water injection is performed under high speed/high load conditions of the engine, the emissions may be reduced. Furthermore, when the water injection is performed under low speed/low load conditions of the engine, an engine stall may be brought about.

Recently, a pneumatic booster system (PBS) that injects compressed air to the intake system in the initial start up of the engine or at a low speed of the engine has been researched and developed. The deterioration of low-speed start-up due to a delay in air boosting of a turbocharger such as a turbo-lag may be overcome by the PBS.

However, in a conventional PBS, as a compressor, a reservoir, and the like are connected to the intake system, the layout of the engine may be complicated.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an engine system and a method for controlling the same, configured for selectively performing a water injection operation, a compressed air injection operation, and a water injection stop operation according to the operating conditions of an engine to thereby achieve the optimal performance in all operating conditions of the engine.

According to various aspects of the present invention, a method for controlling an engine system including an engine having an intake system and an exhaust system, a water injection system having a water injector and a purge circuit purging water from the water injector, and an exhaust gas recirculation (EGR) system recirculating exhaust gases to the intake system may include: a water injection operation of injecting the water into the intake system through the water injector of the water injection system in a first operating condition of the engine in which water injection is required; a compressed air injection operation of injecting compressed air into the intake system through the purge circuit of the water injection system in a second operating condition of the engine in which compressed air injection is required; and a water injection stop operation of stopping the water injection of the water injection system in a third operating condition of the engine in which water injection stop is required.

The water injection system may include a water supply circuit including a water supply pipe, a water tank provided on an upstream side of the water supply pipe, a shut-off valve provided on a downstream side of the water tank, and an injection valve provided on a downstream side of the shut-off valve, and the water injection operation may include a first water filling step of filling the water supply pipe with the water flowing from the water tank to an inlet of the injection valve by continuously opening the shut-off valve for a duration of water injection and closing the injection valve during a predetermined first water filling time.

The water injection operation may include a second water filling step of filling the water supply pipe with the water flowing from the water tank to the water injector by opening the injection valve during a predetermined second water filling time after the first water filling time.

The water injection operation may include a duty control step of controlling the injection valve in accordance with a predetermined pulse width modulation (PWM) duty cycle to repeatedly open and close the injection valve for a predetermined time, after the second water filling step.

The purge circuit may include an air supply pipe connected to the water injector, an air tank provided on an upstream side of the air supply pipe, and a purge valve provided on a downstream side of the air tank, and the compressed air injection operation may be performed by opening the purge valve with a predetermined opening amount to inject the compressed air stored in the air tank into the intake system.

The purge circuit may include an air supply pipe connected to the water injector, an air tank provided on an upstream side of the air supply pipe, and a purge valve provided on a downstream side of the air tank, and the compressed air injection operation may be performed by operating the purge valve in accordance with a predetermined first PWM duty cycle to inject the compressed air stored in the air tank into the intake system.

The compressed air injection may be stopped when a pressure of an intake manifold of the intake system is higher than a predetermined pressure.

The purge circuit may include an air supply pipe connected to the water injector, an air tank provided on an upstream side of the air supply pipe, and a purge valve provided on a downstream side of the air tank, and the water injection stop operation may be performed by purging the water from the water injector by the purge circuit.

The purging of the water injector may include a first purge step and a second purge step.

The first purge step may be performed by controlling the purge valve in accordance with a predetermined second PWM duty cycle to repeatedly open and close the purge valve during a predetermined first purge time.

The second purge step may be performed by controlling the purge valve in accordance with a predetermined third PWM duty cycle after the first purge time to repeatedly open and close the purge valve during a predetermined second purge time.

According to various aspects of the present invention, an engine system may include: an engine having an intake system and an exhaust system; a water injection system having a water injector provided on the intake system and injecting water into the intake system, a water supply circuit supplying the water to the water injector, and a purge circuit purging the water from the water injector; an exhaust gas recirculation (EGR) system disposed between the intake system and the exhaust system; and an engine control unit (ECU) controlling the following operations: a water injection operation of injecting the water into the intake system through the water injector of the water injection system in a first operating condition of the engine in which water injection is required; a compressed air injection operation of injecting compressed air into the intake system through the purge circuit of the water injection system in a second operating condition of the engine in which compressed air injection is required; and a water injection stop operation of stopping the water injection of the water injection system in a third operating condition of the engine in which water injection stop is required.

The water supply circuit may include a water supply pipe connected to the water injector, a water tank provided on an upstream side of the water supply pipe, a shut-off valve provided on a downstream side of the water tank, and an injection valve provided on a downstream side of the shut-off valve.

The engine system may further include a water collection circuit collecting the water from the intake system of the engine to the water tank.

The purge circuit may include an air supply pipe connected to the water injector, an air tank provided on an upstream side of the air supply pipe, and a purge valve provided on a downstream side of the air tank.

The air tank may be an air tank generally mounted in a commercial vehicle, and the air tank may store the compressed air used for air brake, air suspension, and boosting of the engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
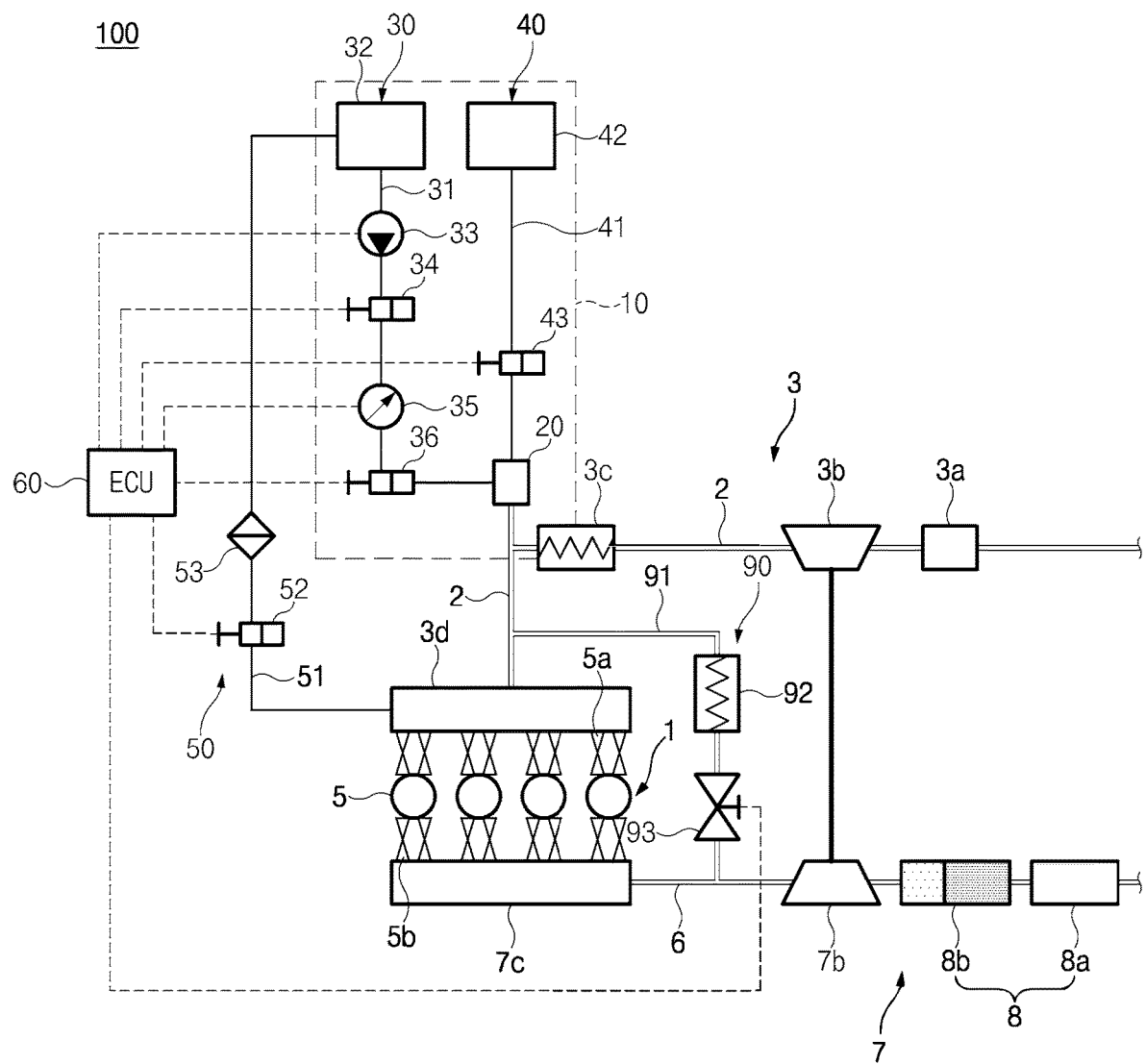
FIG. 1 illustrates the configuration of an engine system, according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present invention will be described in detail with reference to the accompanying drawings. In the drawings, the same reference numerals will be used throughout to designate the same or equivalent elements. Furthermore, a detailed description of well-known techniques associated with the present invention will be ruled out in order not to unnecessarily obscure the gist of the present invention.

Terms such as first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, an engine system 100, according to an exemplary embodiment of the present invention, may include an engine 1, a water injection system 10 selectively injecting water and compressed air into an intake system 3 of the engine 1, an exhaust gas recirculation (EGR) system 90 recirculating exhaust gases to the intake system 3 of the engine 1, and an engine control unit (ECU) 60 controlling the engine 1, the water injection system 10, and the EGR system 90.

The engine 1 may be a multi-cylinder internal combustion engine having a plurality of cylinders 5.

The intake system 3 of the engine 1 may include an air filter 3a provided adjacent to an inlet of an intake pipe 2, a compressor 3b of a turbocharger provided on the downstream side of the air filter 3a, an intercooler 3c provided on the downstream side of the compressor 3b, and an intake manifold 3d communication with an intake port 5a of each cylinder 5.

An exhaust system 7 of the engine 1 may include an after-treatment device 8 provided on an exhaust pipe 6, a turbine 7b of the turbocharger provided on the upstream side of the after-treatment device 8, and an exhaust manifold 7c communicating with an exhaust port 5b of each cylinder 5. The after-treatment device 8 may include various combinations of diesel oxidation catalyst (DOC) 8a, DOC and diesel particulate filter (DPF) integrated structure 8b, selective catalytic reduction (SCR), and the like.

The water injection system 10 may include a water injector 20 injecting water into the intake system 3 of the engine 1, a water supply circuit 30 supplying water to the water injector 20, a purge circuit 40 purging water from the water injector 20, and a water collection circuit 50 collecting water from the intake system 3 of the engine 1.

The water injector 20 may be provided on the intake system 3 to inject water.

According to an exemplary embodiment of the present invention, the water injector 20 may be mounted on the intake pipe 2, as illustrated in FIG. 1, such that the water injector 20 may inject the water into the intake manifold 3d.

According to another exemplary embodiment of the present invention, the water injector 20 may be mounted on the intake manifold 3d such that the water injector 20 may inject the water into the intake port 5a of each cylinder 5.

The water supply circuit 30 may include a water supply pipe 31, a water tank 32 provided on the upstream side of the water supply pipe 31, a water pump 33 pumping water from the water tank 32 to the water injector 20, a shut-off valve 34 provided on the downstream side of the water pump 33, and an injection valve 36 provided on the downstream side of the shut-off valve 34.

The water supply pipe 31 may connect the water tank 32 and the water injector 20.

The shut-off valve 34 may open or close a flow path of the water supply pipe 31 to thereby supply or shut off the water. The shut-off valve 34 may act as a safety valve in a case of failure, leakage, and the like of the injection valve 36. As the shut-off valve 34 receives a water injection signal from the ECU 60, the shut-off valve 34 may be opened. The shut-off valve 34 may be continuously opened for the duration of water injection.

A pressure sensor 35 may be disposed between the shut-off valve 34 and the injection valve 36 to detect an internal pressure of the water supply pipe 31.

The injection valve 36 may be operated in accordance with a pulse width modulation (PWM) duty cycle. The injection valve 36 may adjust a water injection rate, a water injection amount, and the like in accordance with the PWM duty cycle, the water injection duration, and the like. The injection valve 36 may be an electronic control valve such as a solenoid valve.

The purge circuit 40 may include an air supply pipe 41, an air tank 42 provided on the upstream side of the air supply pipe 41, and a purge valve 43 provided on the downstream side of the air tank 42.

The air supply pipe 41 may connect the water injector 20 and the air tank 42.

The air tank 42 may store compressed air. The air tank 42 may be an air tank generally mounted in a commercial vehicle and the like. The air tank 42 may store the compressed air used for air brake, air suspension, boosting of the engine, and the like.

As will be described later, the ECU 60 may control the purge valve 43 to selectively perform the injection of compressed air and the purging of the water injector 20.

According to an exemplary embodiment of the present invention, the opening amount of the purge valve 43 may be adjusted such that it may be set to vary according to a compressed air injection operation OP2 and the purging of the water injector 20.

Figure 2:
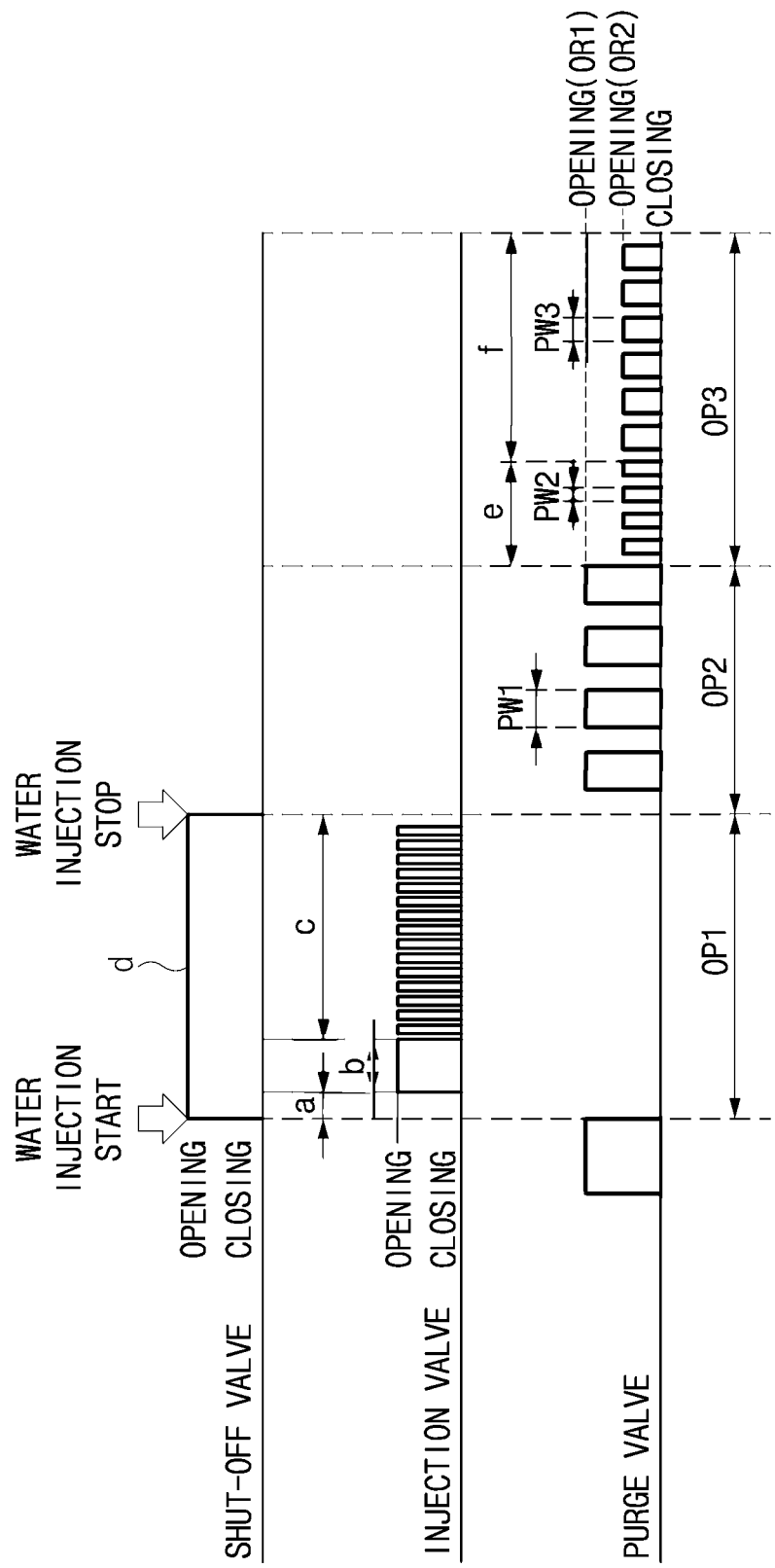
FIG. 2 illustrates a graph of a water injection operation, a compressed air injection operation, and a water injection stop operation of an engine system, according to an exemplary embodiment of the present invention.

As illustrated in FIG. 2, the purge valve 43 may be set to be opened by the ECU 60 with a first opening amount OR1 during the compressed air injection operation OP2. The purge valve 43 may be set to be opened by the ECU 60 with a second opening amount OR2 during the purging of the water injector 20. The ECU 60 may control the opening amount of the purge valve 43 such that the first opening amount OR1 is greater than the second opening amount OR2.

According to another exemplary embodiment of the present invention, the purge valve 43 may be operated in accordance with a PWM duty cycle. The PWM duty cycle of the purge valve 43 may be set to vary according to the compressed air injection operation OP2 and the purging of the water injector 20.

As illustrated in FIG. 2, the purge valve 43 may be operated by the ECU 60 in accordance with a first PWM duty cycle PW1 during the compressed air injection operation OP2. The purge valve 43 may be operated by the ECU 60 in accordance with second and third PWM duty cycles PW2 and PW3 during the purging of the water injector 20.

The ECU 60 may control the PWM duty cycle of the purge valve 43 such that the first PWM duty cycle PW1 is greater than the second and third PWM duty cycles PW2 and PW3.

The ECU 60 may control the opening time, opening amount, PWM duty cycle, and the like of the purge valve 43 to thereby adjust the supply amount and supply rate of the compressed air. The purge valve 43 may be an electronic control valve such as a solenoid valve.

The water collection circuit 50 may collect water from the intake system 3 of the engine 1 to the water tank 32.

According to an exemplary embodiment of the present invention, the water collection circuit 50 may include a water collection pipe 51 connecting the intake system 3 of the engine 1 and the water tank 32, a drain valve 52 provided on the water collection pipe 51, and a filter 53 disposed between the drain valve 52 and the water tank 32.

An inlet of the water collection pipe 51 may be coupled to the intake manifold 3d, and an outlet of the water collection pipe 51 may be coupled to the water tank 32.

The drain valve 52 may be positioned to be lower than the intake pipe 2 or the intake manifold 3d. As the drain valve 52 is opened, the water stagnated in the intake pipe 2 or the intake manifold 3d of the intake system 3 may be smoothly collected to the water tank 32 through the water collection pipe 51.

The drain valve 52 may be a calibratable valve of which the opening amount is variable according to the specification of the intake manifold 3d, the specification of the engine, and the like.

A collection pump may be provided between the drain valve 52 and the water tank 32, and the water collection efficiency may be improved by the collection pump.

When the amount of stagnated water in the intake pipe 2 or the intake manifold 3d of the intake system 3 reaches a predetermined threshold, the drain valve 52 may be opened such that the stagnated water in the intake system 3 may be collected into the water tank 32.

The EGR system 90 may be configured to recirculate exhaust gases discharged from the exhaust system 7 of the engine 1 to the intake system 3 of the engine 1.

The EGR system 90 may include an EGR pipe 91 connected between the exhaust pipe 6 and the intake pipe 2, an exhaust gas recirculation (EGR) cooler 92 provided on the EGR pipe 91, and an EGR valve 93 provided on the upstream side of the EGR cooler 92.

According to an exemplary embodiment of the present invention, as illustrated in FIG. 1, as the EGR pipe 91 is disposed on the upstream side of the turbine 7b, the EGR system 90 may be configured as a high-pressure EGR system.

According to another exemplary embodiment of the present invention, as the EGR pipe 91 is disposed on the downstream side of the after-treatment device 8, the EGR system 90 may be configured as a low-pressure EGR system.

According to another exemplary embodiment of the present invention, the EGR system 90 may include a high-pressure EGR system and a low-pressure EGR system.

The ECU 60 may be based on a microprocessor, and control the engine 1, the water injection system 10, and the EGR system 90. The ECU 60 may include a conventional memory as well as a number of inputs and outputs for interfacing with various sensors, the engine 1, the water injection system 10, and the EGR system 90.

The ECU 60 may preferably include a digital computer generally including a microprocessor or central processing unit, a read only memory (ROM), a random access memory (RAM), an electrically programmable read only memory (EPROM), high speed clock, analog to digital (A/D) and digital to analog (D/A) circuitry, input/output circuitry and devices (I/O), and appropriate signal conditioning and buffer circuitry. Each controller may have a set of control algorithms, including resident program instructions and calibrations stored in ROM and executed to provide the respective functions of each computer.

The water pump 33, the shut-off valve 34, the pressure sensor 35, and the injection valve 36 of the water supply circuit 30 may be electrically connected to the ECU 60. The ECU 60 may control the pressure sensor 35 to detect the pressure of water supplied through the water supply pipe 31, and control the operations of the water pump 33, the shut-off valve 34, and the injection valve 36.

According to an exemplary embodiment of the present invention, the ECU 60 may individually control the shut-off valve 34 and the injection valve 36 at a predetermined time interval to allow the water injector 20 to inject the water after the internal of the water supply pipe 31 is filled with the water.

The purge valve 43 of the purge circuit 40 may be electrically connected to the ECU 60. The ECU 60 may control the operations of the purge valve 43.

The drain valve 52 of the water collection circuit 50 may be electrically connected to the ECU 60. The ECU 60 may control the operations of the drain valve 52. When the amount of stagnated water in the intake manifold 3d reaches a predetermined threshold, the ECU 60 may control the drain valve 52 to open for a predetermined time before the amount of stagnated water exceeds the predetermined threshold. When the amount of stagnated water exceeds the predetermined threshold, the water may flow into the cylinder 5 of the engine 1.

The predetermined threshold may be determined through a test using information on the number of water injection, the amount of water injected, and the like. The predetermined threshold may be variable according to the specification of the intake manifold 3d, the specification of the engine, and the like.

The EGR valve 93 of the EGR system 90 may be electrically connected to the ECU 60, and the ECU 60 may control the flow of EGR gas by controlling the opening and closing operations, opening amount, and the like of the EGR valve 93.

Referring to FIGS. 2, 3, 8, and 10, the ECU 60 may perform a water injection operation OP1 of injecting water into the intake system 3 of the engine 1 through the water injector 20 of the water injection system 10 in a first operating condition D1 of the engine in which water injection is required, the compressed air injection operation OP2 of injecting compressed air into the intake system 3 of the engine 1 through the purge circuit 40 of the water injection system 10 in a second operating condition D2 of the engine in which compressed air injection is required, and a water injection stop operation OP3 of stopping the water injection of the water injection system 10 in a third operating condition D3 of the engine in which water injection stop is required.

Referring to FIGS. 3 to 7, the ECU 60 may perform the water injection operation OP1 of injecting the water into the intake system 3 of the engine 1 through the water injector 20 of the water injection system 10 in the first operating condition D1 of the engine 1 in which the water injection is required.

The first operating condition D1 of the engine 1 may be a condition in which the engine 1 overheats or excessively generates nitrogen oxides ($NO_x$), such as high speed/high load condition of the engine 1. As the water is injected into the intake system 3 in the first operating condition D1, it may reduce the overheating of the engine 1 to improve fuel efficiency, and reduce nitrogen oxides ($NO_x$). The first operating condition D1 may be set to avoid an operating condition in which the stall of the engine 1 occurs due to the water injection.

Figure 3:
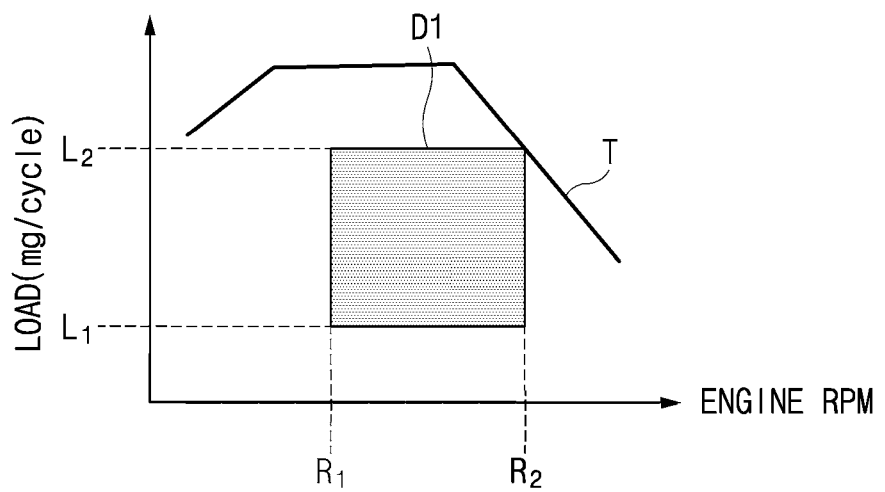
FIG. 3 illustrates a first operating condition of an engine system, according to an exemplary embodiment of the present invention.
Figure 4:
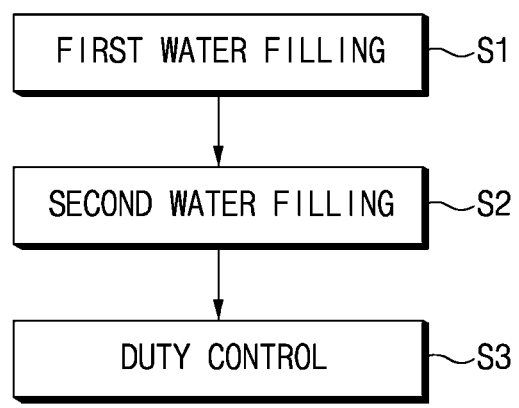
FIG. 4 illustrates a flowchart of a water injection operation of an engine system, according to an exemplary embodiment of the present invention.

As illustrated in FIG. 3, the first operating condition D1 of the engine 1 may be defined by revolutions per minute (RPM) section of the engine 1 between a predetermined first RPM R1 and a predetermined second RPM R2, and a load section of the engine 1 between a predetermined first load L1 and a predetermined second load L2. The first RPM R1 and the second RPM R2 may be determined by engine RPM data and be stored in the memory of the ECU 60, and the first load L1 and the second load L2 may be determined by accelerator pedal data and be stored in the memory of the ECU 60. In FIG. 3, line T depicts an upper limit for operating the engine in an enriched, wide-open-throttled (WOT) SI mode, also referred to as a peak torque engine operation.

The water injection operation OP1 may include a first water filling step S1, a second water filling step S2, and a duty control step S3, as illustrated in FIG. 4, FIG. 5, FIG. 6, and FIG. 7.

When the ECU 60 transmits a water injection signal to the water pump 33, the shut-off valve 34, and the injection valve 36 in the first operating condition D1 of the engine 1, the water may be supplied to the water injector 20 by the water supply circuit 30, and the water injector 20 may inject the water into the intake system 3 during a predetermined injection time.

The shut-off valve 34 may be continuously opened during the predetermined injection time (see "d" in FIG. 2). As the shut-off valve 34 is opened and the water pump 33 is operated, the water may flow out of the water tank 32 such that the water supply pipe 31 may be filled with the water. Hereinafter, the filling of the water supply pipe 31 with water is referred to as a water filling step. The water filling step may include the first water filling step S1 and the second water filling step S1 which are sequentially performed.

Figure 5:
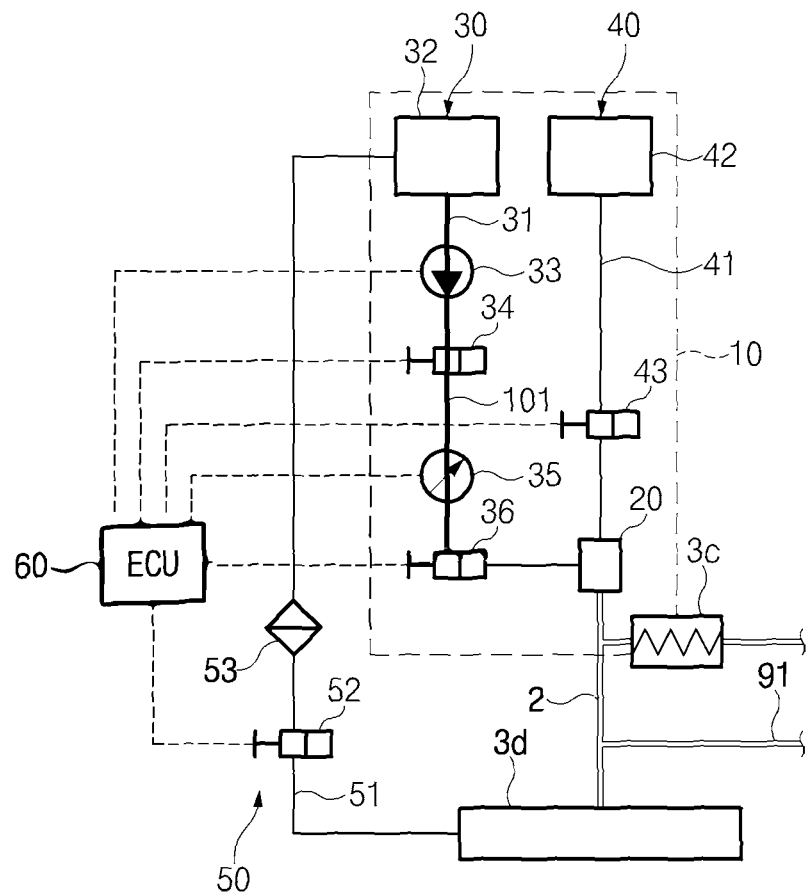
FIG. 5 illustrates a first water filling step in a water injection operation of an engine system, according to an exemplary embodiment of the present invention.

The first water filling step S1 may be performed such that the shut-off valve 34 is opened and the injection valve 36 is closed. As illustrated in FIG. 5, as the injection valve 36 is closed during a first water filling time (see "a" in FIG. 2), the water supply pipe 31 may be filled with the water flowing from the water tank 32 to an inlet of the injection valve 36 (see "101" in FIG. 5). Here, the pressure sensor 35 may measure the supply pressure of the water filled in the water supply pipe 31, and the ECU 60 may determine the first water filling time a using the water supply pressure, the internal volume of the water supply pipe 31, and the like.

Figure 6:
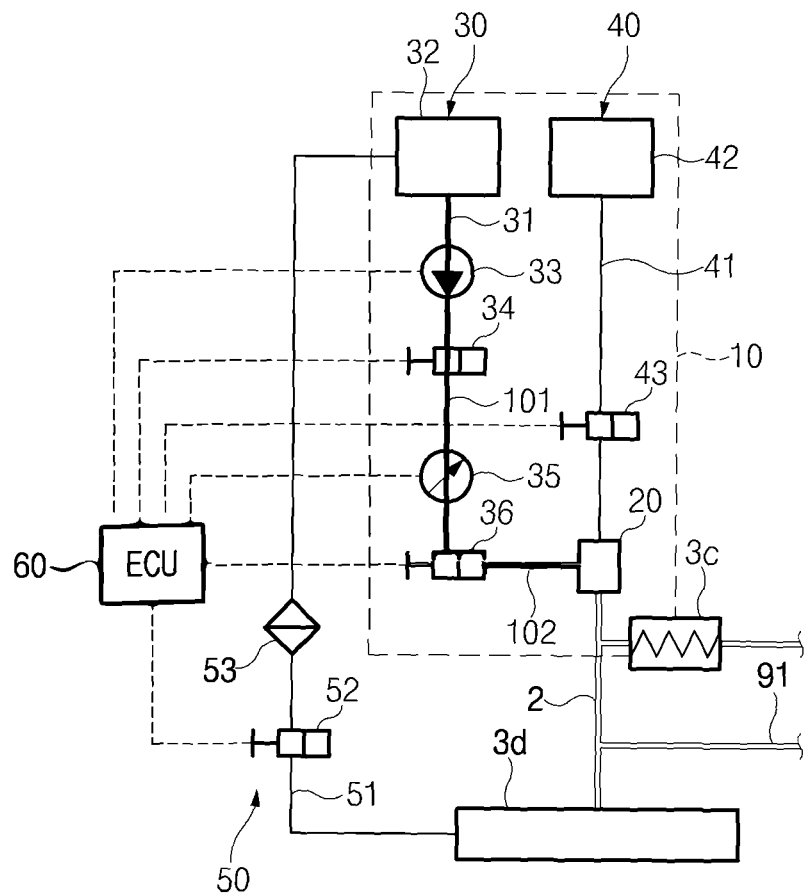
FIG. 6 illustrates a second water filling step in a water injection operation of an engine system, according to an exemplary embodiment of the present invention.

After the first water filling step S1, the second water filling step S2 may be performed such that the shut-off valve 34 and the injection valve 36 are opened. As illustrated in FIG. 6, as the injection valve 36 is opened during a second water filling time (see "b" in FIG. 2) after the first water filling time a, the water supply pipe 31 may be filled with the water flowing from the water tank 32 to the water injector 20 (see "102" in FIG. 6). Here, the ECU 60 may determine the second water filling time b using the water supply pressure, the internal volume of the water supply pipe 31, and the like. Furthermore, the ECU 60 may determine the amount of water filled in the second water filling step using the second water filling time b and the internal volume of the water supply pipe 31 which is filled with the water in the second water filling step, and determine the amount of water leaked into the intake pipe 2 or the intake manifold 3d from the water injector 20 by subtracting the amount of water filled in the second water filling step from the amount of water supplied from the water tank 32.

As described above, the stepwise filling of the water supply pipe 31 with the water in the water filling steps S1 and S2 before injecting the water by the water injector 20 may make water injection more efficiently and precisely.

Figure 7:
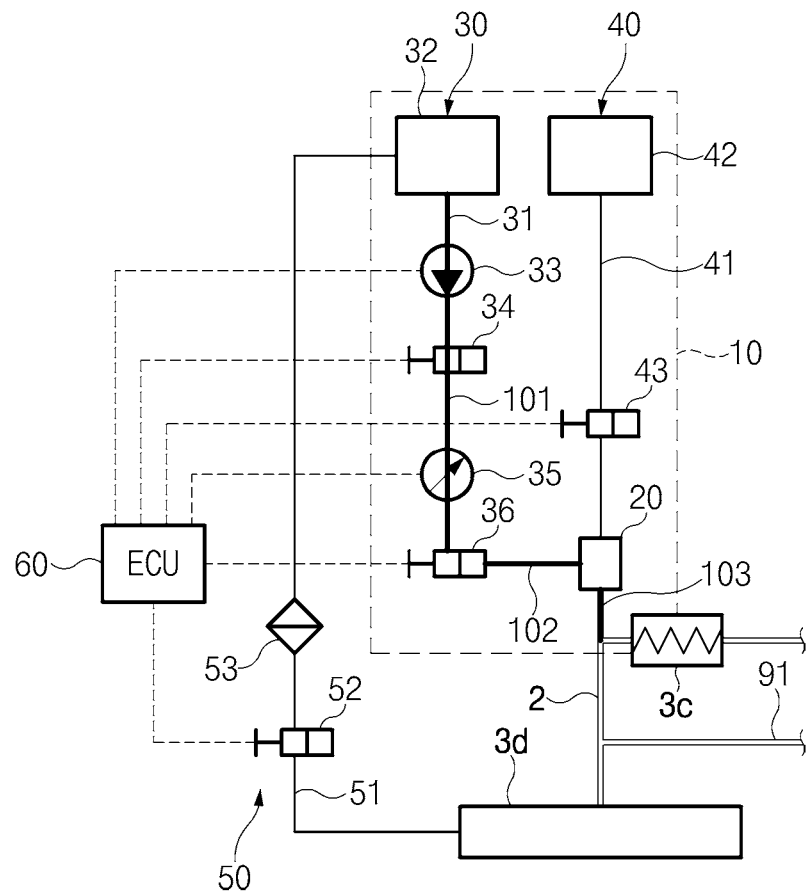
FIG. 7 illustrates a duty control step in a water injection operation of an engine system, according to an exemplary embodiment of the present invention.

After the second water filling step S2, as illustrated in FIG. 7, as the ECU 60 controls the injection valve 36 in accordance with a predetermined PWM duty cycle, the opening and closing of the injection valve 36 may be repeated for a predetermined time (see "c" in FIG. 2) in the duty control step S3. Through the duty control of the injection valve 36, a predetermined amount of water may be injected by the water injector 20 (see "103" in FIG. 7).

As described above, as the opening and closing of the injection valve 36 are performed in accordance with the predetermined duty cycle in the duty control step S3, atomization of the water may be made stable, preventing the generation of droplets or minimizing the droplet size.

Figure 8:
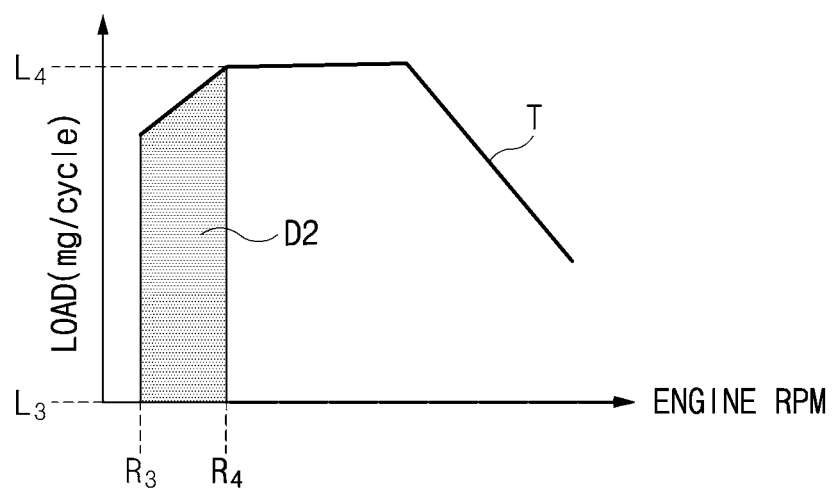
FIG. 8 illustrates a second operating condition of an engine system, according to an exemplary embodiment of the present invention.
Figure 9:
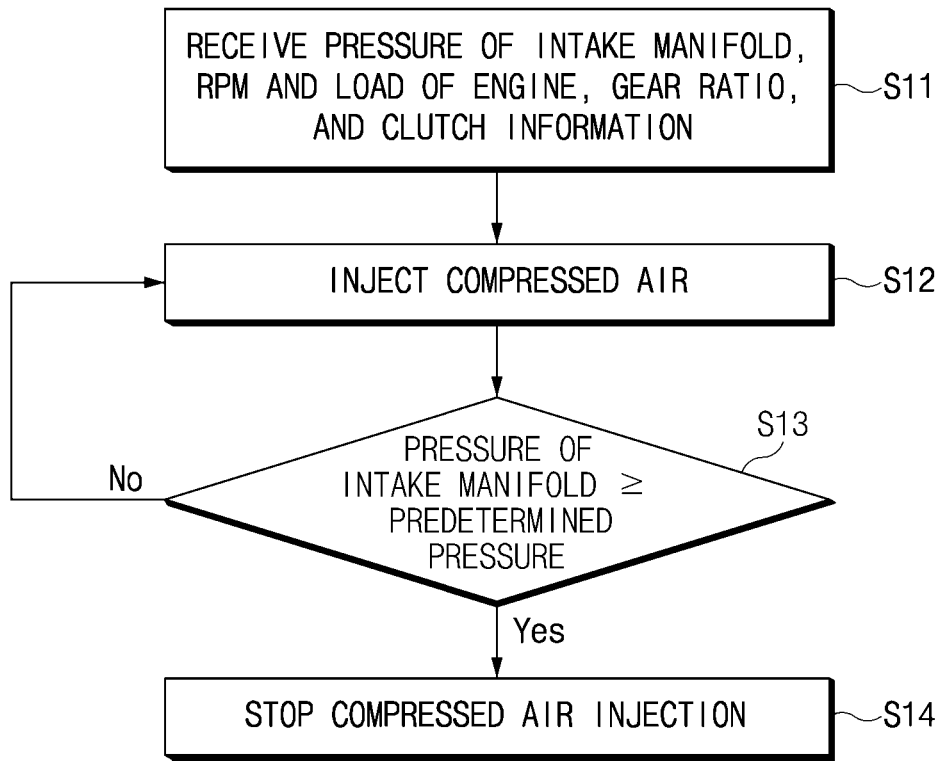
FIG. 9 illustrates a flowchart of a compressed air injection operation of an engine system, according to an exemplary embodiment of the present invention.

Referring to FIGS. 2, 8, and 9, the ECU 60 may perform the compressed air injection operation OP2 of injecting the compressed air into the intake system 3 of the engine 1 through the purge circuit 40 and the water injector 20 of the water injection system 10 in the second operating condition D2 of the engine 1 in which the compressed air injection is required.

The second operating condition D2 of the engine 1 may correspond to a low speed section in which a delay in air boosting of the turbocharger occurs. By injecting the compressed air into the intake system 3 by the purge circuit 40 and the water injector 20 of the water injection system 10 in the second operating condition D2 of the engine 1, low-speed start-up performance may be improved.

As illustrated in FIG. 8, the second operating condition D2 of the engine 1 may be defined by an RPM section of the engine 1 between a predetermined third RPM R3 and a predetermined fourth RPM R4, and a load section of the engine 1 between a predetermined third load L3 and a predetermined fourth load L4. The third RPM R3 and the fourth RPM R4 may be determined by engine RPM data and be stored in the memory of the ECU 60, and the third load L3 and the fourth load L4 may be set by accelerator pedal data and be stored in the memory of the ECU 60.

The third RPM R3 and the fourth RPM R4 may be set to be lower than the first RPM R1, and when the third load L3 is set to be lower than the first load L1 and the second load L2, the fourth load L4 may correspond to a maximum peak of the engine 1. In FIG. 8, line T depicts an upper limit for operating the engine in an enriched, wide-open-throttled (WOT) SI mode, also referred to as the peak torque engine operation.

The second operating condition D2 may be set on the basis of a pressure of the intake manifold, gear ratio, clutch information, and the like, in addition to the RPM and load of the engine.

FIG. 9 illustrates a flowchart of the compressed air injection operation OP2 by the purge circuit 40 of the water injection system 10.

Referring to FIG. 9, the ECU 60 may receive the pressure of the intake manifold 3d, the RPM and load of the engine 1, the gear ratio, the clutch information, and the like in step S11.

When a current operating condition of the engine 1 corresponds to the second operating condition D2 of the engine 1, the ECU 60 may transmit a compressed air injection signal to the water pump 33, the shut-off valve 34, and the injection valve 36 of the water supply circuit 30 and the purge valve 43 of the purge circuit 40. The water pump 33 may be stopped, and the shut-off valve 34 and the injection valve 36 may be closed, such that the water injection operation may be stopped. Thereafter, the purge valve 43 of the purge circuit 40 may be opened such that the compressed air stored in the air tank 42 may be injected into the intake system 3 through the water injector 20 in step S12.

According to an exemplary embodiment of the present invention, as illustrated in FIG. 2, the ECU 60 may open the purge valve 43 with the predetermined first opening amount OR1 during the compressed air injection operation OP2. According to another exemplary embodiment of the present invention, as illustrated in FIG. 2, the ECU 60 may operate the purge valve 43 in accordance with the predetermined first PWM duty cycle PW1 during the compressed air injection operation OP2. According to another exemplary embodiment of the present invention, the ECU 60 may operate the purge valve 43 in accordance with the first opening amount OR1 and the first PWM duty cycle PW1 during the compressed air injection operation OP2.

As the compressed air is injected into the intake system 3 and the pressure of the intake manifold 3d is higher than or equal to a predetermined pressure in step S13, the purge valve 43 may be closed such that the compressed air injection may be stopped in step S14.

As the operating conditions of the engine change in real time, the ECU 60 may perform the compressed air injection operation OP2 and the water injection operation OP1 alternately.

Figure 10:
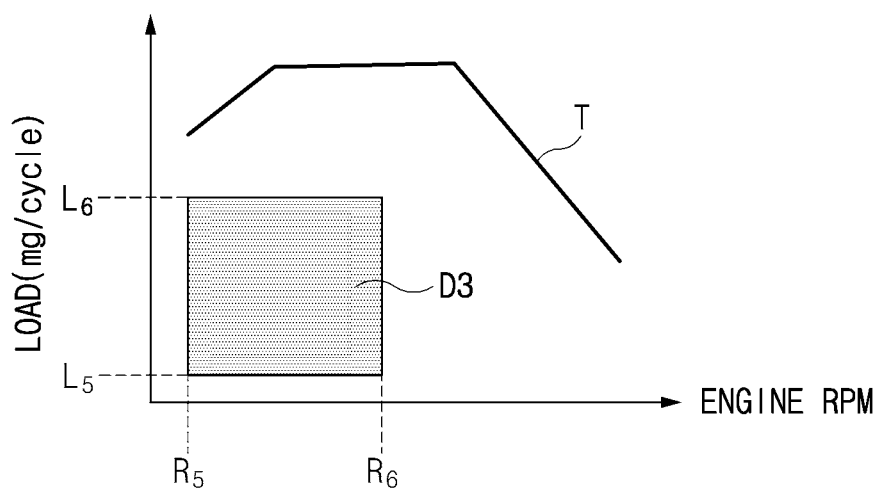
FIG. 10 illustrates a third operating condition of an engine system, according to an exemplary embodiment of the present invention.

Referring to FIG. 10, the ECU 60 may perform the water injection stop operation OP3 of stopping the water injection of the water injection system 10 in the third operating condition D3 of the engine in which the water injection stop is required.

The third operating condition D3 of the engine 1 may be a condition in which the water injection stop is required, such as low speed/low load condition of the engine 1. The third operating condition D3 may be set to avoid an operating condition in which the stall of the engine 1 occurs. As the ECU 60 opens the EGR valve 93 of the EGR system 90 in the third operating condition D3, the exhaust gases may be recirculated from the exhaust system 7 of the engine 1 to the intake system 3 of the engine 1, and thus the nitride oxides may be reduced.

As illustrated in FIG. 10, the third operating condition D3 of the engine 1 may be defined by an RPM section of the engine 1 between a predetermined fifth RPM R5 and a predetermined sixth RPM R6, and a load section of the engine 1 between a predetermined fifth load L5 and a predetermined sixth load L6. The fifth RPM R5 and the sixth RPM R6 may be determined by engine RPM data and be stored in the memory of the ECU 60, and the fifth load L5 and the sixth load L6 may be determined by accelerator pedal data and be stored in the memory of the ECU 60.

The fifth RPM R5 may be set to be lower than the first RPM R1, and the sixth RPM R6 may be set to be lower than the second RPM R2. The fifth load L5 may be set to be lower than the first load L1, and the sixth load L6 may be set to be lower than the second load L2. In FIG. 10, line T depicts an upper limit for operating the engine in an enriched, wide-open-throttled (WOT) SI mode, also referred to as the peak torque engine operation.

Meanwhile, as illustrated in FIGS. 11 to 14, the ECU 60 may stop the water injection in the third operating condition D3, and control the purging of the water injector 20 to purge the water from the water injector 20.

Figure 11:
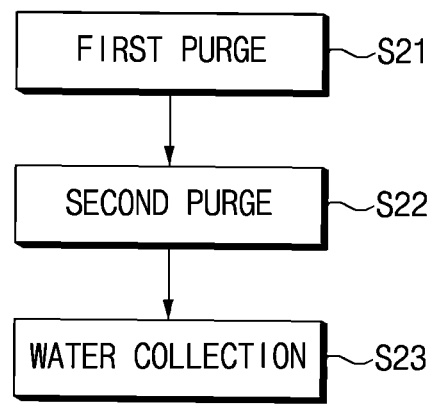
FIG. 11 illustrates a flowchart of a water injection stop operation of an engine system, according to an exemplary embodiment of the present invention.

The purging of the water injector 20 may include a first purge step S21 and a second purge step S22 as illustrated in FIG. 11.

Referring to FIG. 11, the ECU 60 may close the shut-off valve 34 and the injection valve 36, and perform the purging of the water injector 20 during a predetermined purge time.

The purging of the water injector 20 will be described in detail below.

Figure 12:
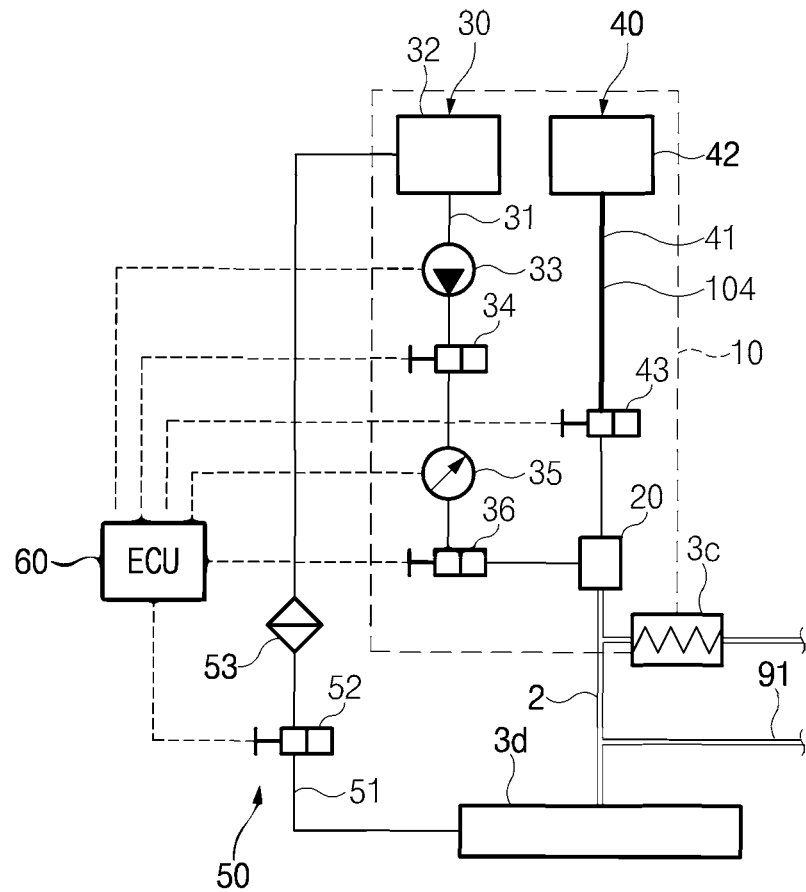
FIG. 12 illustrates a state of an engine system before a first purge step, according to an exemplary embodiment of the present invention.

The purge valve 43 may be closed during the water injection operation as illustrated in FIG. 12 (see "104" in FIG. 12). After the water injection is stopped, the first purge step S21 may be performed by operating the purge valve 43 during a predetermined first purge time (see "e" in FIG. 2).

Figure 13:
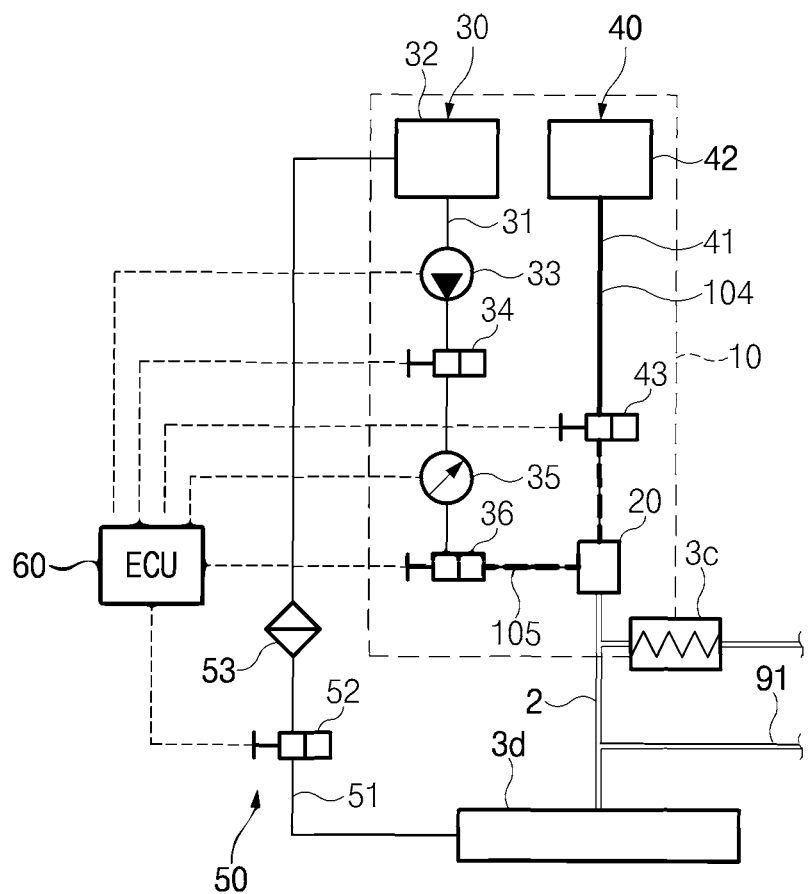
FIG. 13 illustrates a first purge step of an engine system, according to an exemplary embodiment of the present invention.

The ECU 60 may control the purge valve 43 in accordance with the predetermined second PWM duty cycle PW2 such that the opening and closing of the purge valve 43 may be repeated during the predetermined first purge time e in step S21. As illustrated in FIG. 13, the compressed air from the air tank 42 may pass through the air supply pipe 41 and be supplied to the water injector 20 and the internal of the water supply pipe 31 connected to the water injector 20, and thus the water remaining in the water supply pipe 31 communicating with the water injector 20 may be discharged by purging (see "105" in FIG. 13).

After the first purge step S21, the second purge step S22 may be performed during a predetermined second purge time (see "f" in FIG. 2).

The ECU 60 may control the purge valve 43 in accordance with the predetermined third PWM duty cycle PW3 such that the second purge step S22 may be performed. Here, the third PWM duty cycle PW3 may be greater than the second PWM duty cycle. For example, the third PWM duty cycle may be 60%, and the second PWM duty cycle may be 30%. In the compressed air injection operation OP2, the first PWM duty cycle PW1 may be greater than the third PWM duty cycle PW3.

Furthermore, the second purge time f may be longer than the first purge time e.

Figure 14:
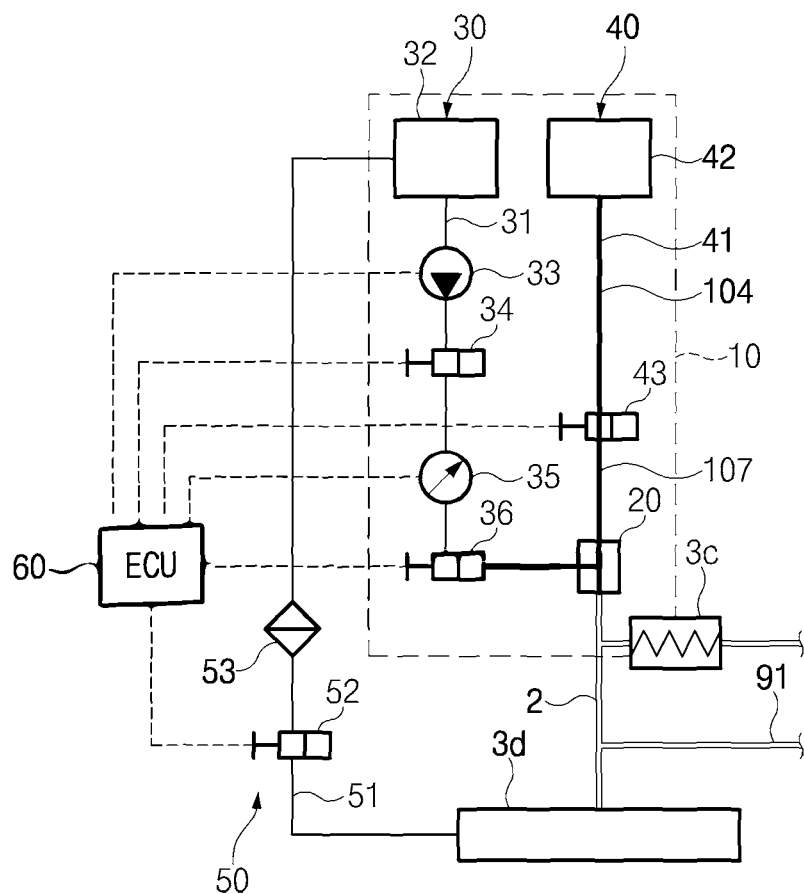
FIG. 14 illustrates a second purge step of an engine system, according to an exemplary embodiment of the present invention.

In the second purge step S22, as illustrated in FIG. 14, the compressed air from the air tank 42 may pass through the air supply pipe 41 and be supplied to the water injector 20, and thus the nozzle clogging of the water injector 20 due to the backflow of the EGR gas may be prevented (see "107" in FIG. 14).

As described above, the water may be sequentially purged from the water supply pipe 31 and the water injector 20 in the first purge step S21 and the second purge step S22, preventing the water from remaining in the water supply pipe 31 and the water injector 20.

After the second purge step S22, the ECU 60 may determine the amount of stagnated water in the intake manifold 3d, and open the drain valve 52 for a predetermined time when the amount of stagnated water reaches a predetermined threshold, collecting the stagnated water in the intake manifold 3d into the water tank 32 through the water collection pipe 51 in step S23.

The ECU 60 may determine (predict) the amount of stagnated water using the amount of water leaked from the water injector 20 in the water filling step (especially, the second water filling step S2), the amount of stagnated water in the intake pipe 2 or the intake manifold 3d which is not atomized when the water injector 20 injects the water in the duty control step S3, and the amount of water discharged from the water supply pipe 31 in the first purge step S21.

The ECU 60 may determine the amount of water filled in the second water filling step using the second water filling time b and the internal volume of the water supply pipe 31 which is filled with the water in the second water filling step, and determine the amount of water leaked into the intake pipe 2 or the intake manifold 3d from the water injector 20 by subtracting the amount of water filled in the second water filling step from the amount of water supplied from the water tank 32.

When the water is injected from the water injector 20 in the duty control step S3, the water may fail to flow into the cylinder in a state in which the water is fully atomized (100%), and a portion of the water may be stagnated in the intake pipe 2 or the intake manifold 3d due to flow characteristics and a wall wetting phenomenon in a flow velocity reducing section. In this regard, the ECU 60 may determine the amount of stagnated water in the duty control step S3 through a test based on the amount of water in accordance with injection amount, injection pressure, and injection time.

The ECU 60 may determine the amount of water discharged by purging in the first purge step S21 using the second PWM duty cycle PW2 during the first purge time e, the internal pressure of the water supply pipe 31, and the like.

As set forth above, the engine system and the method for controlling the same, according to exemplary embodiments of the present invention, can selectively perform a water injection operation, a compressed air injection operation, and a water injection stop operation according to the operating conditions of the engine to thereby achieve the optimal performance in all operating conditions of the engine.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents

What is claimed is:

1. A method for controlling an engine system including an engine having an intake system and an exhaust system, a water injection system having a water injector and a purge circuit purging water from the water injector, and an exhaust gas recirculation (EGR) system recirculating exhaust gases to the intake system, the method comprising:
    a water injection operation of injecting, according to a signal of a controller, the water into the intake system through the water injector of the water injection system in a first operating condition of the engine in which water injection is required;
    a compressed air injection operation of injecting according to a signal of the controller, compressed air into the intake system through the purge circuit of the water injection system in a second operating condition of the engine in which compressed air injection is required; and
    a water injection stop operation of stopping according to a signal of the controller, the water injection of the water injection system in a third operating condition of the engine in which water injection stop is required,
    wherein the water injection system includes a water supply circuit including a water supply pipe, a water tank provided on an upstream side of the water supply pipe, a shut-off valve provided on a downstream side of the water tank, and an injection valve provided on a downstream side of the shut-off valve and on an upstream side of the water injector, and
    wherein the water injection operation includes:
        a first water filling step of filling the water supply pipe with the water flowing from the water tank to an inlet of the injection valve by continuously opening the shut-off valve for a duration of water injection and closing the injection valve during a predetermined first water filling time in the duration of the water injection; and
        a second water filling step of filling the water supply pine with the water flowing from the water tank to the water injector by opening the injection valve during a predetermined second water filling time after the predetermined first water filling time in the duration of the water injection.

2. The method according to claim 1, wherein the water injection operation further includes a duty control step of controlling the injection valve in accordance with a predetermined pulse width modulation (PWM) duty cycle to repeatedly open and close the injection valve for a predetermined time, after the second water filling step in the duration of the water injection.

3. The method according to claim 1,
    wherein the purge circuit includes an air supply pipe connected to the water injector, an air tank provided on an upstream side of the air supply pipe, and a purge valve provided on a downstream side of the air tank and on an upstream side of the water injector, and
    wherein the compressed air injection operation is performed by opening the purge valve with a predetermined opening amount to inject the compressed air stored in the air tank into the intake system.

4. The method according to claim 1,
    wherein the purge circuit includes an air supply pipe connected to the water injector, an air tank provided on an upstream side of the air supply pipe, and a purge valve provided on a downstream side of the air tank and on an upstream side of the water injector, and
    wherein the compressed air injection operation is performed by operating the purge valve in accordance with a predetermined first PWM duty cycle to inject the compressed air stored in the air tank into the intake system.

5. The method according to claim 3, wherein the compressed air injection is stopped when a pressure of an intake manifold of the intake system is higher than a predetermined pressure.

6. The method according to claim 1,
    wherein the purge circuit includes an air supply pipe connected to the water injector, an air tank provided on an upstream side of the air supply pipe, and a purge valve provided on a downstream side of the air tank and on an upstream side of the water injector, and wherein the water injection stop operation is performed by purging the water from the water injector by operating the purge valve of the purge circuit.

7. The method according to claim 6, wherein the purging of the water injector includes a first purge step and a second purge step.

8. The method according to claim 7, wherein the first purge step is performed by controlling the purge valve in accordance with a predetermined second PWM duty cycle to repeatedly open and close the purge valve during a predetermined first purge time period.

9. The method according to claim 8, wherein an amplitude of the predetermined second PWM duty cycle is smaller than an amplitude of the predetermined first PWM duty cycle.

10. The method according to claim 8, wherein the predetermined second PWM duty cycle is smaller than the predetermined first PWM duty cycle.

11. The method according to claim 8, wherein the second purge step is performed by controlling the purge valve in accordance with a predetermined third PWM duty cycle after the predetermined second purge time period to repeatedly open and close the purge valve during a predetermined second purge time period.

12. The method according to claim 11, wherein the predetermined third PWM duty cycle is smaller than the predetermined first PWM duty cycle.

13. The method according to claim 11, wherein amplitude of the predetermined third PWM duty cycles are smaller than an amplitude of the predetermined first PWM duty cycle.

14. An engine system, comprising:
an engine having an intake system and an exhaust system;
a water injection system having a water injector provided on the intake system and configured for selectively injecting water into the intake system, a water supply circuit supplying the water to the water injector, a purge circuit engaged to the water supply circuit and selectively purging the water from the water injector and a water collection circuit;
an exhaust gas recirculation (EGR) system disposed and connected between the intake system and the exhaust system; and
a controller electrically connected to the water injection system and configured for executing operations of:
injecting the water into the intake system through the water injector of the water injection system in a first operating condition of the engine in which water injection is required;
injecting compressed air into the intake system through the purge circuit of the water injection system in a second operating condition of the engine in which compressed air injection is required; and
stopping the water injection of the water injection system in a third operating condition of the engine in which water injection stop is required,
wherein the water supply circuit includes a water supply pipe connected to the water injector, a water tank provided on an upstream side of the water supply pipe, a shut-off valve provided on a downstream side of the water tank, and an injection valve provided on a downstream side of the shut-off valve and on an upstream side of the water injector,
wherein the water collection circuit is configured to collect the water from the intake system of the engine to the water tank,
wherein the water collection circuit includes a water collection pipe connecting the intake system of the engine and the water tank, and
wherein the operation of injecting the water into the intake system includes:
a first water filling step of filling the water supply pipe with the water flowing from the water tank to an inlet of the injection valve by continuously opening the shut-off valve for a duration of water injection and closing the injection valve during a predetermined first water filling time in the duration of the water injection; and
a second water filling step of filling the water supply pipe with the water flowing from the water tank to the water injector by opening the injection valve during a predetermined second water filling time after the predetermined first water filling time in the duration of the water injection.

15. The engine system according to claim 14, wherein the purge circuit includes an air supply pipe connected to the water injector, an air tank provided on an upstream side of the air supply pipe, and a purge valve provided on a downstream side of the air tank and on an upstream side of the water injector.

* * * * *